(12) United States Patent
Moon et al.

(10) Patent No.: US 6,260,364 B1
(45) Date of Patent: Jul. 17, 2001

(54) ABSORPTION COOLING SYSTEM HAVING AN IMPROVED DILUTION CONTROL APPARATUS

(75) Inventors: In Shik Moon, Uijungbu; Jin Sang Ryu, Gyeonggi-do, both of (KR); Neelkanth Shridhar Gupte, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/580,182

(22) Filed: May 26, 2000

(51) Int. Cl.[7] ................................................ F25B 15/00
(52) U.S. Cl. ................................ 62/141; 62/476; 62/103
(58) Field of Search ............................. 62/141, 476, 103, 62/105, 119

(56) References Cited

U.S. PATENT DOCUMENTS

| | | | |
|---|---|---|---|
| 3,604,216 | * 9/1971 | Porter | 62/476 X |
| 3,626,710 | * 12/1971 | Porter | 62/141 |
| 3,626,711 | * 12/1971 | Porter et al. | 62/141 |
| 5,806,325 | 9/1998 | Furukawa et al. | |
| 5,813,241 | * 9/1998 | Sibik et al. | 62/141 X |
| 5,927,086 | * 7/1999 | Suzuki et al. | 62/141 |
| 6,177,025 | * 1/2001 | Ring et al. | 62/476 X |

FOREIGN PATENT DOCUMENTS

| | | | |
|---|---|---|---|
| 02033582 | * | 2/1990 | (JP) . |
| 4-47226 | | 8/1992 | (JP) . |
| 08121895 | * | 5/1996 | (JP) . |

* cited by examiner

Primary Examiner—William Doerrler
Assistant Examiner—Chen-Wen Jiang
(74) Attorney, Agent, or Firm—Wall Marjama & Bilinski

(57) ABSTRACT

A dilution control apparatus for use in an absorption cooling system of the type which uses a refrigerant and an absorbent, and which includes a generator, a condenser having a condenser sump, an absorber having an absorber sump, and an evaporator having an evaporator sump. At least one refrigerant reservoir is arranged to receive refrigerant condensing within the condenser, and to store a quantity of refrigerant which, if released into the system during the dilution phase of the system shutdown process, is sufficient to lower the concentration of the refrigerant-absorbent solution to a concentration low enough to prevent crystals from forming in the absorber after the shutdown process has been completed. Refrigerant is released from the at least one refrigerant reservoir to the evaporator sump at a variable rate, through a first refrigerant releasing path, when the system operates under a cooling load that fluctuates with time. Refrigerant is released from the at least one refrigerant reservoir to the evaporator sump, through the first refrigerant releasing path and through a second refrigerant releasing path, when the system is being shut down.

18 Claims, 4 Drawing Sheets

ABSORPTION COOLING SYSTEM HAVING AN IMPROVED DILUTION CONTROL APPARATUS

BACKGROUND OF THE INVENTION

This invention relates to absorption cooling systems and to absorption heating and cooling systems. In particular, the invention relates to a dilution control apparatus for releasing, into such systems, within the available dilution time, a quantity of additional refrigerant sufficient to enable them to shut down without creating conditions that allow crystals of the absorbent to form in their absorbers.

In an absorption type cooling system, an absorbent is dissolved in a liquid refrigerant to produce a refrigerant-absorbent solution that is suitable for use in the process. When such a system operates under cooling loads that vary, the amount of refrigerant necessary to keep the system running efficiently will also vary. As a result, it is a common practice to equip such a cooling system with a refrigerant adjusting system which includes a refrigerant storage reservoir, and to store refrigerant in or release refrigerant from this reservoir as necessary to keep the concentration of the solution within an acceptable range of concentrations as the cooling load fluctuates. This storage reservoir often takes the form of a sump that is located in or in close association with the system condenser.

One example of a cooling mode refrigerant adjusting system of the above-described type is described in unexamined Japanese application 62-178858, which is assigned to Ebara Ltd. of Tokyo, Japan. In the latter application, there is disclosed an absorption machine in which the gravity flow of liquid refrigerant between the system condenser and the system evaporator is controlled in response to a sensed condition of the system, such as the solution temperature as it is leaving the absorber. A reservoir for liquid refrigerant is provided inside the condenser and the refrigerant is supplied to the evaporator through a first flow path under normal operating conditions. Upon the sensing of a condition that calls for an increase in the quantity of refrigerant, a second flow path is opened which supplies additional refrigerant from the condenser to the evaporator.

Another example of a refrigerant adjusting system is described in copending U.S. patent application Ser. No. 09/244,910, filed Feb. 4, 1999, which is commonly assigned herewith, and which is hereby expressly incorporated by reference herein. In the latter application, there is disclosed an absorption type machine in which refrigerant is stored in a holding tank that is separate from the condenser sump and that is filled via a refrigerant bleed line. The desired refrigerant concentration is then maintained by releasing refrigerant from the holding tank under the control of a microprocessor in response to the sensing of a need for additional refrigerant.

An example of a refrigerant adjusting system that is specially adapted for use in an absorption type refrigerator is described in U.S. Pat. No. 5,806,325 (Furukawa et al). In the latter patent there is described an absorption type refrigerator in which a storage reservoir is formed in the condenser by a dam with an array of holes that allows the rate at which refrigerant is released to vary as a function of the rate at which refrigerant condenses and, consequently, as a function of the cooling load that the refrigerator must support.

When an absorption type cooling system is shut down, it is necessary to release into the system, within a time known as the dilution time, a quantity of refrigerant which is sufficient to dilute or reduce the concentration of the absorbent-refrigerant solution within the absorber to a value low enough to prevent crystals of the absorbent from forming therein. The diluting of this solution during the shut down process is known as the dilution cycle of the system. Prior to the present invention, the additional refrigerant necessary to enable the system to complete its dilution cycle was provided in one of two ways. A first of these was to pump the additional refrigerant from a specially provided storage tank. This approach is not cost effective, however, not only because of the cost of providing such a storage tank, but also because of the cost of providing the associated pump and pump control circuitry.

A second way of providing the additional refrigerant necessary to complete the dilution process was to release into the system the contents of the refrigerant storage reservoir or tank that is used as a part of its cooling mode refrigerant adjusting system. This way of diluting the solution, however, has a deficiency that limits its usefulness. This is that the reservoir outlets and piping through which refrigerant is released during the cooling mode refrigerant adjusting process are too small to allow the refrigerant necessary to complete the dilution process to be released within the available dilution time. As a result, the released refrigerant may not be able to mix with the absorbent-refrigerant solution rapidly enough to prevent crystals from forming in the absorber.

While the above-mentioned deficiency may be overcome by providing circuitry which senses the occurrence of a shut down condition, and which opens valves that controllably increase the rate at which refrigerant is released into the evaporator, the provision of such circuitry and valves substantially increases the cost of the shut down portion of the cooling system. The provision of such control circuitry and valves also increases the complexity of the system and thereby introduces failure modes that decrease the overall reliability thereof.

In view of the foregoing, it will be seen that, prior to the present invention, there existed a need for a simple but effective way of releasing into an absorption cooling system, within the available dilution time, a quantity of refrigerant sufficient to prevent crystals from forming in the absorber after the system has been shut down.

SUMMARY OF THE INVENTION

In accordance with the present invention there is provided an improved dilution control apparatus that provides a simple but effective way of releasing into the system, within the available dilution time, a quantity of refrigerant sufficient to prevent crystals from forming in the absorber sump after the system has been shut down.

Generally speaking, the present invention includes, in association with the condenser, a primary refrigerant reservoir having a storage capacity sufficient to store a quantity of refrigerant which, if released into the system during the dilution phase of the shutdown process, is sufficient to lower the concentration of the solution from a concentration which is within the range of concentrations that the solution may have when the system operates normally in its cooling mode to a concentration which is low enough to prevent crystals of the absorbent from forming in the absorber after the system has been shut down. When the system operates in its cooling mode, refrigerant is released from this reservoir, via a primary refrigerant releasing structure which includes a primary refrigerant barrier, such as a dam, that is located at one extremity of the primary reservoir and that defines at least one (preferably two) flow paths along which refrigerant may be released from the primary reservoir into the evaporator sump. These flow paths assure that the system is provided with refrigerant at a rate which is sufficient to assure that the system operates efficiently in spite of fluctuations in the cooling load carried by it. In preferred embodiments of the invention, refrigerant flowing along these flow paths are mixed together in an outlet box and supplied to the evaporator through a single primary drain pipe.

The present invention also includes a secondary refrigerant reservoir and a secondary refrigerant releasing structure which does not release refrigerant into the evaporator sump when the system is operating in its cooling mode, but which does release refrigerant into the evaporator sump when the condition of the system indicates that it is being shut down, i.e., when the dilution cycle is in progress. As a result, the secondary reservoir and secondary refrigerant releasing structure increase the rate at which refrigerant is released into the system during the dilution cycle, and thereby prevent crystals from forming in the absorber after the shutdown process has been completed.

In all preferred embodiments of the invention, the secondary refrigerant reservoir is located at an extremity of the primary refrigerant reservoir, and is arranged to be in bidirectional fluidic communication therewith. This allows the level of the refrigerant in the secondary reservoir to rise and fall with the level of refrigerant in the primary reservoir. The secondary refrigerant releasing structure preferably includes an opening having a size which is dependent on the rate at which refrigerant is to be released into the evaporator during shut down. Refrigerant released through this opening is preferably directed into the evaporator sump through a secondary drain pipe which is separate from the primary drain pipe.

In accordance with the invention, the secondary refrigerant releasing means is arranged so that it begins to release refrigerant stored in the secondary refrigerant reservoir as the dilution cycle begins. This is accomplished by connecting the secondary drain pipe to the evaporator sump through a suitable blocking device which remains closed to block the flow of refrigerant through the second drain pipe when the dilution cycle is not in progress, but which opens to unblock that flow when the dilution cycle is in progress. This blocking device may comprise a valve, such as an solenoid or pressure actuated valve, which is actively actuated as, for example, by a control circuit that is responsive to the shutdown of the refrigerant pump or to the reduction in the discharge pressure of the refrigerant pump that accompanies the shutdown thereof. If the secondary discharge line is connected to the evaporator sump through the discharge line of the refrigerant pump, this blocking device may also comprise a valve, such as a check valve, which is automatically actuated by the reduction in the discharge pressure of the refrigerant pump that accompanies the shutdown thereof. It will be understood that all such blocking devices, and equivalents thereof, are within the contemplation of the present invention.

In preferred embodiments of the invention, the opening through which secondary refrigerant releasing structure releases refrigerant into the secondary drain pipe is located in proximity to the opening through which the primary refrigerant releasing structure releases refrigerant into the primary drain pipe. This proximity allows the primary and secondary refrigerant releasing structures to release refrigerant into their respective drain pipes through different respective parts of a single outlet box. Embodiments of this type have the advantage that they cost less to build than embodiments which use separate outlet boxes. In embodiments of this type, the outlet box is provided with a partition that keeps the two parts thereof fluidically separate from one another.

In all preferred embodiments of the invention, the primary and secondary refrigerant reservoirs are located above the evaporator sump, thereby assuring that refrigerant may flow from these reservoirs to the evaporator sump without being pumped thereto, i.e., under the force of gravity. In these embodiments, the primary refrigerant reservoir is located in the condenser and comprises the sump thereof. If desired, however, the refrigerant reservoir of the invention may comprise a tank that is separate from the condenser, provided that it is positioned to fill with refrigerant condensing within the condenser without being pumped, and to empty into the evaporator without being pumped.

Advantageously, the simplicity of the refrigerant control apparatus of the invention allows it to be applied to absorption cooling systems of all widely used types. It may, for example, be applied to cooling systems which use either a series or parallel absorption cycle. It may also be applied to heating and cooling systems which use any of a single, double or triple effect absorption cycle.

BRIEF DESCRIPTION OF THE DRAWING

For a better understanding of these and other objects of the invention, reference will be made to the following detailed description of the invention, which is to be read in association with the accompanying drawings, wherein.

DETAILED DESCRIPTION OF THE INVENTION

Figure 1:
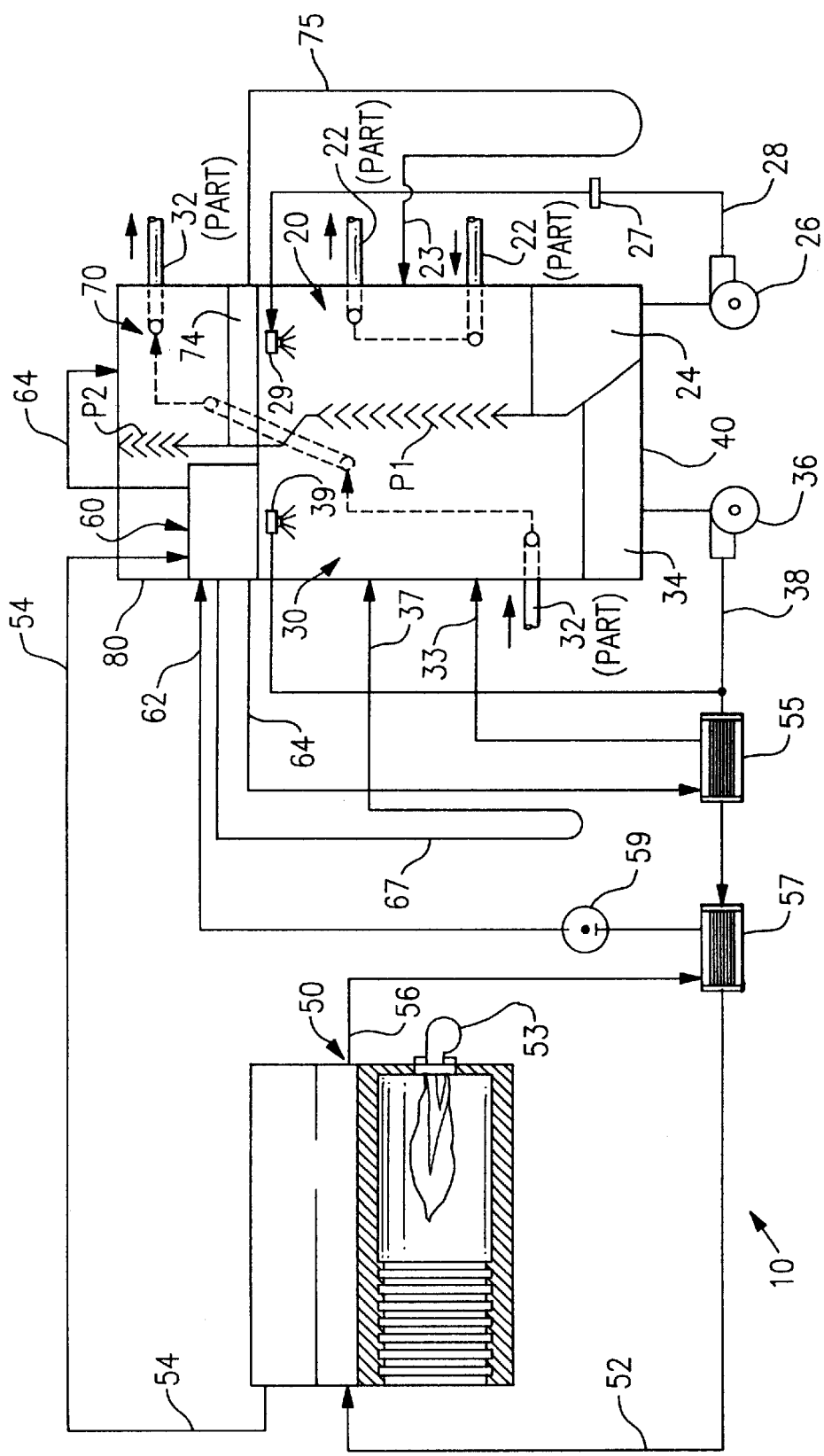
FIG. 1 is a simplified schematic diagram of a two-stage absorption machine of a type which is known in the art.

Referring to FIG. 1, there is shown a simplified schematic diagram of an absorption cooling system 10 of one type that is known in the art, in this case a two-stage, series cycle cooling system. Other types of absorption systems may use more or fewer stages, may be able to operate in both a cooling mode and a heating mode, and may use a parallel rather than a series cycle. It will therefore be understood that the cooling system of FIG. 1 comprises only an exemplary one of the many types of absorption systems that might have been used as a descriptive background for the present invention. As will be explained more fully later, the dilution control apparatus of the invention may be applied to the cooling portions any of these types of absorption systems.

Absorption system 10 of FIG. 1 comprises a closed fluidic system which contains a refrigerant that exists in both a vapor phase and a liquid phase, an absorbent, and a solution of the absorbent in the refrigerant. In the following description, it will be assumed that machine 10 employs water as a refrigerant and lithium bromide, which has a high affinity for water, as an absorbent.

Absorption system 10 of FIG. 1 includes an evaporator 20 and an absorber 30 mounted in a side-by-side relationship within a common shell 40. System 10 also includes a high temperature generator 50 and a low temperature generator 60 for generating refrigerant vapor from the absorbent-refrigerant solution, and condenser 70 for receiving that refrigerant vapor and condensing it to produce liquid refrigerant. Condenser 70 is located immediately adjacent to and above evaporator 20, and is disposed in side-by-side relationship with low temperature generator 60 within a common shell 80.

When system 10 is operating in its cooling mode, liquid refrigerant from condenser 70 is supplied to evaporator 20, where it is vaporized to absorb heat from a fluid, usually water, that is being chilled. The water being chilled is brought through the evaporator through a chilled water line 22 and a heat exchanger assembly, not shown. Vaporized refrigerant developed within evaporator 20 passes to absorber 30, through a partition P1, where it is absorbed by a relatively strong solution to form a relatively weaker solution. Heat developed in the absorption process is taken out of the absorber by cooling water flowing through a cooling water line 32 and a heat exchanger assembly, not shown.

The solution in absorber 30 collects in an absorber sump 34 and is pumped therefrom by a suitable solution pump 36. Part of this solution is recirculated through interior of the absorber through a spray head 39 to enhance the absorption process. The remainder of the solution passes through a first, low temperature solution heat exchanger 55 and a second, high temperature solution heat exchanger 57, and is supplied to high temperature generator 50 via solution inlet line 52 thereof. As the solution within high temperature generator 50 is heated by a suitable heat source 56, refrigerant vapor is driven off and supplied to low temperature generator 60 and condenser 70 through vapor lines 54 and 64. The heated solution remaining within the high temperature generator then exits through a solution outlet line 56 and is supplied to absorber 30 through a solution inlet line 33. On the way, this solution passes through heat exchanger 57, valve orifice 59, low temperature generator 60, via inlet and outlet lines 62 and 64 thereof, and heat exchanger 55 to assure that much of the thermal energy stored therein is recovered, thereby reducing the amount of heat that must be supplied by heat source 53. The machine shown in FIG. 1 may also be provided with an overflow path, which may take the form of a J-tube 67, through which excess solution within low temperature generator 60 may be supplied to absorber 30 through a suitable inlet 37.

Refrigerant vapor which is released into condenser to 70 via vapor lines 54 and 64, along with refrigerant vapor which is released into condenser 70 by low temperature generator 60, via a partition P2, is cooled by cooling water flowing through cooling water line 32 and a heat exchanger, not shown. This vapor condenses to form liquid refrigerant which collects in a condenser sump 74. From condenser sump 74, the liquid refrigerant flows toward evaporator 20, under the force of gravity, through a suitable J-tube 75 and refrigerant inlet line 23, and collects within an evaporator sump 24.

Liquid refrigerant is pumped out of evaporator sump by a suitable refrigerant pump 26 and supplied through a refrigerant discharge line 28 and an orifice plate 27 to a spray head 29, which sprays the refrigerant into the interior of the evaporator chamber. There it evaporates as a result of the low pressure maintained therein by absorber 30, through partition P1, to produce the already described cooling effect on fluid, usually water, flowing through chilled water line 22. The refrigerant vapor then passes through partition P1 into the interior of evaporator 30, where it is absorbed by the solution that is pumped from absorber sump 34 by solution pump 36 and sprayed thereover through spray head 39. The solution that collects within absorber sump 34 as this occurs is then either recirculated through spray head 39 or directed back to high temperature generator 50, in the manner described earlier, to complete the cycle.

Because cooling systems of the-above-described type are well known to those skilled in the art, the operation of the system of FIG. 1 in its cooling mode will not be further described herein. Because the manner in which the system of FIG. 1 may be modified for operation in a heating mode is also well known to those skilled in the art, the operation of the system of FIG. 1 in a heating mode will also not be described herein.

When system 10 is operating in its cooling mode, it is desirable for the refrigerant-absorbent solution to have a concentration which is relatively high, i.e., to be relatively strong or refrigerant-poor, but which varies over a range of concentrations that fluctuates with the cooling load thereon. More particularly, it is desirable for the concentration of the solution to increase as the cooling load on the system increases. This increase in concentration is preferably accomplished by providing the cooling system with a cooling mode refrigerant adjusting system that causes liquid refrigerant to be withdrawn from the solution, (i.e., withdrawn from active circulation within the system) as the cooling load increases, and which releases liquid refrigerant into the system as the cooling loads decreases.

In absorption cooling systems of the type described in unexamined Japanese application 62-178858, and in U.S. Pat. No. 5,806,325 (Furukawa et al), the refrigerant adjusting system includes a refrigerant storage reservoir that forms a part of the condenser and may comprise the condenser sump. This condenser sump/reservoir is designed to store a quantity of liquid refrigerant which is just sufficient to allow the concentration of the solution to be adjusted as necessary to assure optimum operating efficiency under conditions in which the cooling load on the system fluctuates with time. Such adjustments are made by releasing or not releasing refrigerant from the condenser sump/reservoir to the evaporator sump as necessary to meet changing load conditions.

The desired refrigerant release may be accomplished actively, by means of a controllable valve and specially provided drain line, in response to a system variable such as the temperature of the solution at the outlet of the absorber, as described in the above-cited unexamined Japanese application. The desired refrigerant release may also be accomplished passively by providing the reservoir with a dam that includes a vertically disposed array of release holes and an overflow structure, as described in the above-cited Furukawa patent. Since adjusting systems of this type are described in detail in the above-cited references, they will not be further discussed herein.

While refrigerant adjusting systems of the above-mentioned types operate reasonably well when a cooling system is actively operating in its cooling mode, they can create problems when the system is to be completely shut down. This is because a complete shutdown requires that the system be left in a condition in which it can be restarted without difficulty. In particular, the system must be left in a condition in which none of its constituent parts are clogged by crystals of the absorbent. Such crystals are especially likely to form in the parts of the system, such as the absorber sump, the solution pump, and the absorber spray head, where the solution is strongest. It is therefore necessary to shut the system down in accordance with a shutdown procedure that includes the release into the absorber, within a suitably short time, of a quantity of refrigerant sufficient to dilute the solution therein enough to assure that crystals do not form in these parts even after the temperature of the system falls to ambient temperatures.

The part of the above-mentioned shutdown process that is devoted to the dilution of the solution in the absorber is known as the dilution cycle, and the time within which the dilution cycle must be completed is known as the dilution time. Both the quantity of the diluting refrigerant and the time within which it is released are important. This is because even a sufficient quantity of diluting refrigerant may allow crystals to form if it is released too late for there to occur an adequate degree of mixing between the refrigerant and the absorbent. As will be explained more fully presently, the dilution apparatus of the invention increases the rate at which the required quantity of diluting refrigerant is released and thereby assures that this quantity is released within the available dilution time.

Referring to FIGS. 2 through 5, there is shown an absorption cooling system which includes one embodiment of the dilution apparatus of the invention. The cooling system shown in FIGS. 2 through 5 is generally similar to that described in connection with FIG. 1, like functioning parts being similarly numbered, except that it includes an additional refrigerant storage reservoir 100, most clearly shown in FIG. 3A, and an additional refrigerant release path 110 that cooperate to increase the rate at which diluting refrigerant is supplied to the evaporator sump while the dilution cycle is in progress. For the sake of clarity, the storage reservoir and refrigerant release path of the invention will be distinguished from the reservoir and refrigerant release path of the refrigerant adjusting portion of the system by referring to the latter as the primary reservoir and primary refrigerant release path of the system, and by referring to the reservoir and refrigerant release path of the invention as the secondary reservoir and secondary refrigerant release path of the system.

Figure 2:
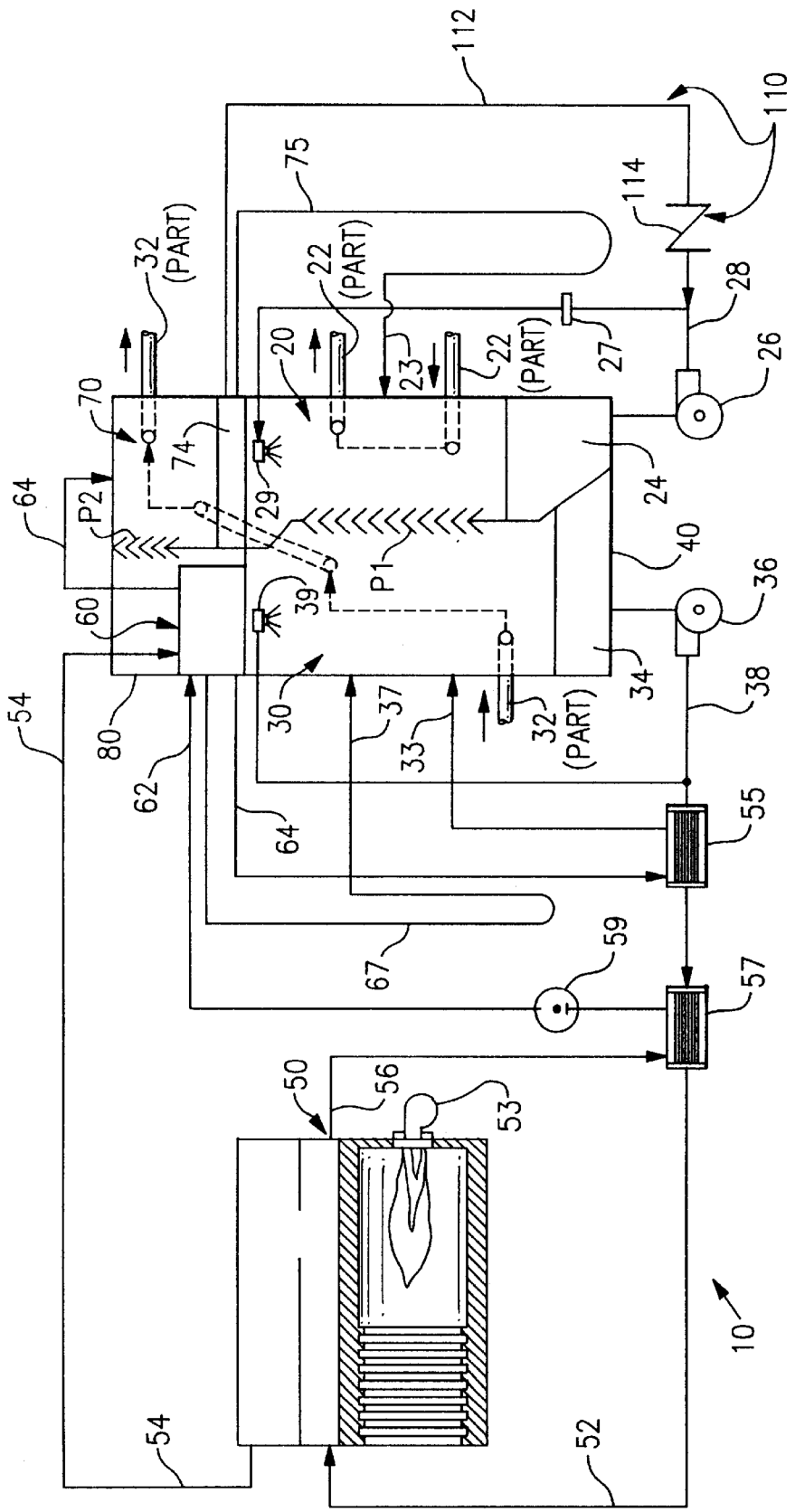
FIG. 2 is a simplified schematic diagram of an absorption machine of the type shown in FIG. 1 which has been modified to include a dilution control apparatus of the type contemplated by the present invention.
Figure 3A:
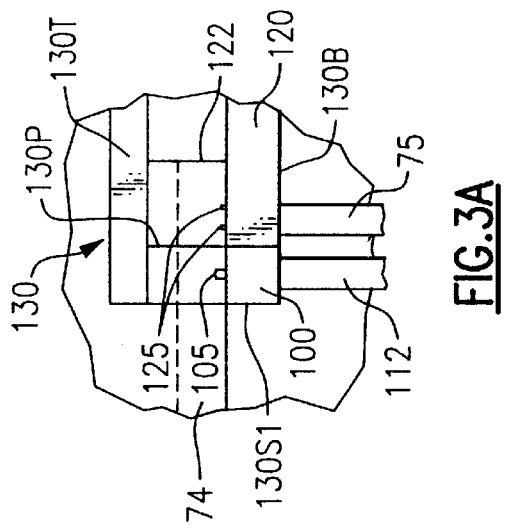
FIG. 3A is an enlarged, fragmentary cutaway view of a part of the outlet box of the absorption machine of FIG. 3, shown with its front plate removed.
Figure 3:
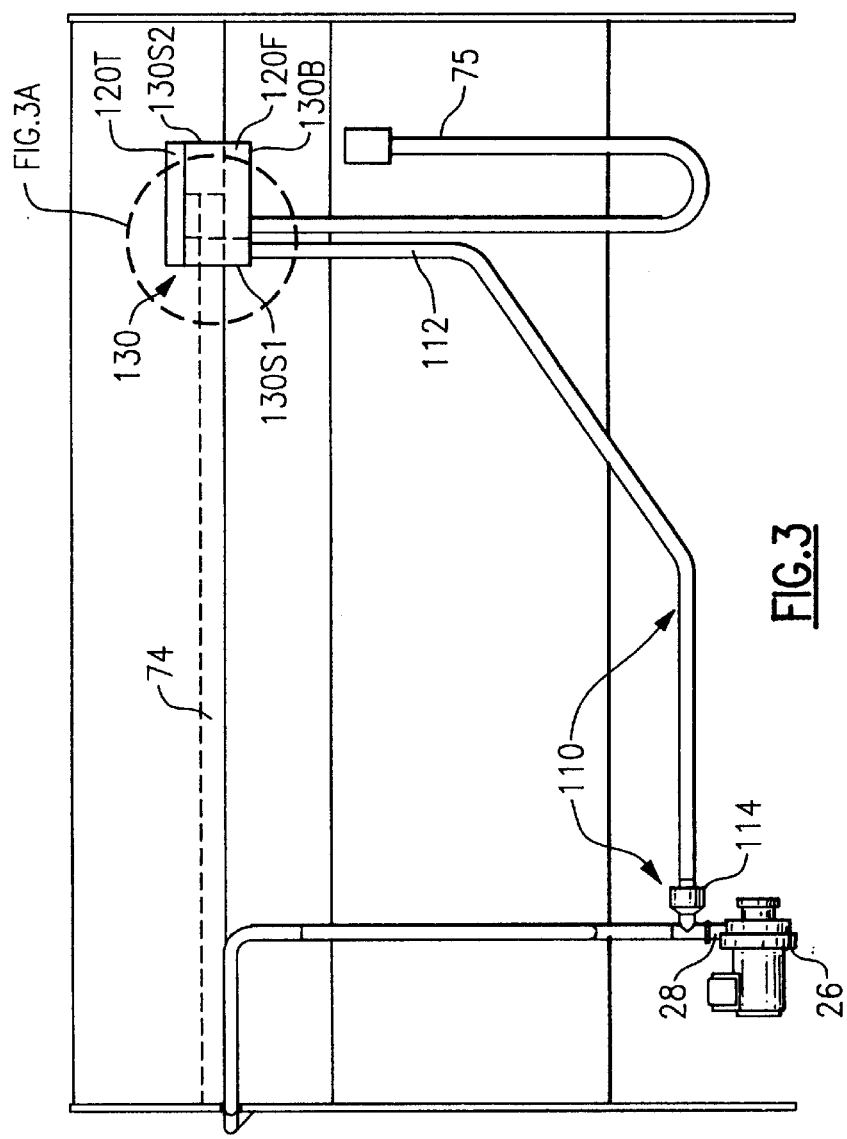
FIG. 3 is a rear elevation of the absorption machine shown in FIG. 2.

The primary reservoir of the embodiment of the invention shown in FIGS. 2 and 3 is located inside of condenser 70 and comprises sump 74 thereof. This reservoir includes the lower portion of condenser 70 and has a capacity that is defined by the lower surface of shell 80 and a dam 122 (most clearly shown in FIG. 4) that extends generally perpendicularly across the long axis of shell 80. As will be apparent to those skilled in the art, the primary reservoir may also comprise a separate tank (not shown) which is located below condenser 70, but above evaporator 20, provided that this tank is positioned so that liquid refrigerant may flow, under the force of gravity, both from the condenser to the tank and from the tank to the evaporator. Because of the additional cost of providing such a separate tank, reservoirs of this type are not used in preferred embodiments of the invention.

The primary refrigerant release path of the embodiment of the invention shown in FIGS. 2 and 3 is defined, in part, by refrigerant drain pipe 75 and a refrigerant collecting chamber 120 which is located within a suitable outlet box 130 that is secured to condenser shell 80 in proximity to dam 122. The primary refrigerant release path is also preferably defined by two paths through which liquid refrigerant may be released from reservoir 74 into chamber 120 and drain pipe 75. A first of these release paths includes one or more openings, such as holes 125 of FIG. 3A, which are formed through a part of the sidewall of condenser shell 70 near dam 122, and which open into chamber 120 of outlet box 130. Refrigerant is released from reservoir 74 through this path, at a relatively slow rate that varies with the depth of the refrigerant in reservoir 74. The flow of refrigerant through this path is associated with the above described refrigerant adjusting process, and is important to the efficient operation of the system when the latter operates at cooling loads that vary between about 25% and 80% of its maximum rated capacity. A second of these release paths includes the path that extends from reservoir 74 to chamber 120 over the top of dam 122. The flow of refrigerant through this path is also associated with the refrigerant adjusting process, and becomes important when the system operates at a cooling load greater than about 80% of its maximum rated capacity. Because the use of refrigerant release paths of these types is well known to those skilled in the art, these paths will not be described in detail herein.

The secondary reservoir of the embodiment of the invention shown in FIGS. 2 and 3 is located adjacent to condenser 70 and is in fluidic communication with sump 74 thereof through a suitable opening 105 through condenser shell 80. This reservoir includes a refrigerant collecting chamber 100 which is located in the lower left portion of the interior of outlet box 130, i.e., the volume bounded by left side plate 130S1, front plate 120F, bottom plate 130B, and a plate 130P that partitions the interior of box 130 into two fluidically isolated parts. As will be explained more fully later, this reservoir is properly regarded as including the internal volume of a pipe 112 through which chamber 100 is drained into evaporator 20 during the dilution phase of the shutdown process.

The secondary refrigerant releasing structure of the invention comprises a drain assembly 110 which is disposed between secondary reservoir 100 and evaporator sump 24. In the embodiment of FIGS. 2 and 3, this assembly includes drain pipe 112 and valve 114 and is connected to evaporator sump 24 through the discharge line of refrigerant pump 26. When the system is operating in its cooling mode, pump 26 is running. Under this condition, valve 114 is closed, thereby blocking the release of refrigerant from reservoir 100 through pipe 112. When the system is shutting down, however, pump 26 is turned off. Under this condition, valve 114 opens, thereby allowing the refrigerant in chamber 100 and the interior of pipe 112 to flow into evaporator sump 24 through pump 26. In accordance with the invention, the sizes of chamber 100 and hole 105 and the diameter of pipe 112 are all selected so that the quantity of refrigerant which is released into evaporator sump 24 therethrough (when added to the quantity of refrigerant which is released into evaporator sump 24 through pipe 75 of the primary refrigerant releasing path) is high enough to assure that sump 24 overflows into absorber sump 34, through partition P1, while the dilution cycle of the system is in progress. This, in turn, assures that, when the shutdown process is complete, the solution in the absorber has been sufficiently diluted that crystals of the absorbent cannot form therein.

In the preferred embodiment of the invention, valve 114 comprises a check valve which is held closed by the discharge pressure of pump 26 when the latter is running, but which opens automatically when that discharge pressure falls as pump 26 is turned off during the shut down process. Valve 114 may, for example, comprise a swing-type check valve with a closure member which swings upwardly to block the secondary refrigerant release path when pump 26 is running and producing a discharge pressure which is greater than a predetermined value, but which swings downwardly to unblock the secondary refrigerant release path when pump 26 is turned off and becomes unable to maintain that pressure. Valve 114 may also, however, comprise a valve that is actuated electronically by a separate control circuit which is responsive to a pressure, such as the discharge pressure of pump 26, or to the speed or on/off state of pump 26. It will be understood that all such embodiments, and their equivalents, are within the contemplation of the present invention.

Figure 4:
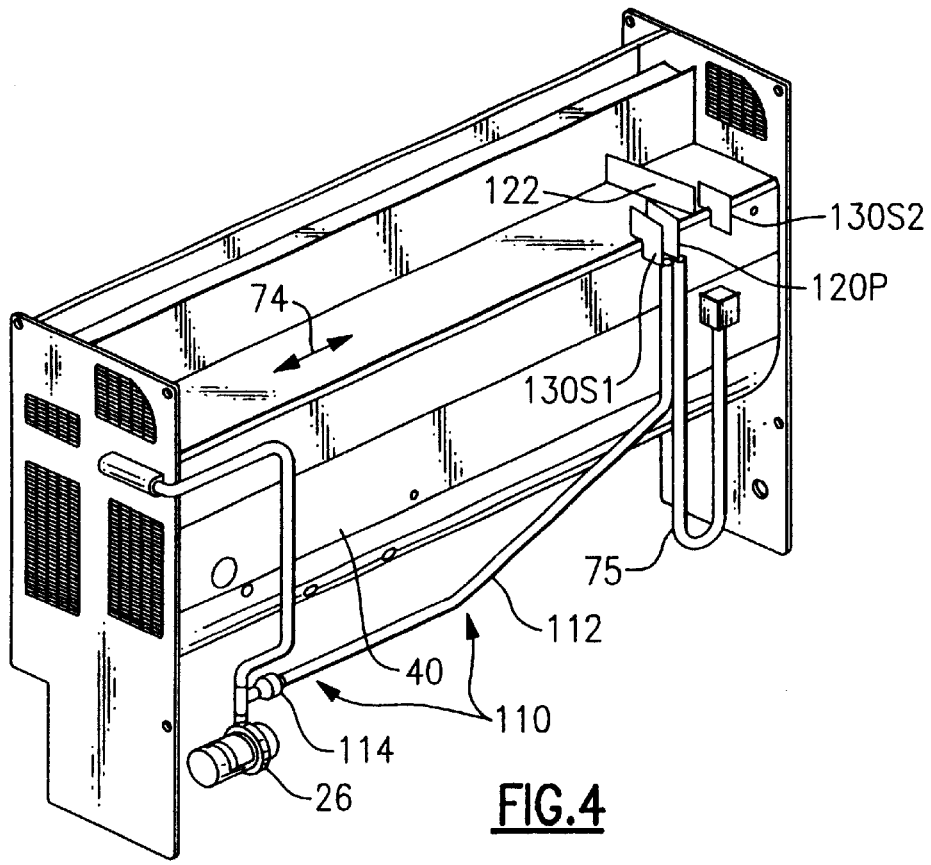
FIG. 4 is a simplified, oblique view of the absorption machine of FIG. 3, shown with the front and upper parts of the condenser shell and outlet box removed.

While the present invention has been described with reference to the preferred embodiment shown in FIGS. 2 through 4, it may be practiced by means of a number of other embodiments which have different configurations. In the preferred embodiment, for example, the primary and secondary refrigerant reservoirs and refrigerant releasing structures are both connected to a single outlet box 130. There is no reason, other than a lower cost of manufacture, why a single outlet box is used. It will therefore be understood that a system constructed in accordance with the present invention may have a secondary refrigerant reservoir and secondary refrigerant releasing structure which use an outlet box that is separate from that used with the primary refrigerant reservoir and primary refrigerant releasing structure.

In addition, since the quantity of refrigerant stored in the secondary refrigerant reservoir is equal to the sum of the quantities of refrigerant stored in chamber 100 and in pipe 112, the size of chamber 100 is not critical, and may be such that the quantity of refrigerant stored in chamber 100 is either larger or smaller than the quantity of refrigerant stored in pipe 112. As a result, chamber 100 may be made as large or as small, relative to pipe 112, as desired.

Finally, while the apparatus of the invention has been described with reference to a two-stage, series cycle absorption cooling system, it could just as well have been described with reference to cooling systems of any of a variety of other types, including a single-stage, parallel cycle system, among others. This is because systems of all types are differentiated from one another largely by the numbers of their generators and heat exchanger and by the ways in which the latter are connected to one another and to the absorber, and not by the way in which their condensers are connected to their evaporators. Since it is the latter connections that are important for purposes of the present invention, it will be seen that the apparatus of the invention may be applied to all of these systems, without regard to the numbers of their stages or the kinds of cycles used therein. Accordingly, the application of the invention to these other types of systems will not be specifically described herein. It will nevertheless be understood that such systems are within the contemplation of the present invention.

Figure 5:
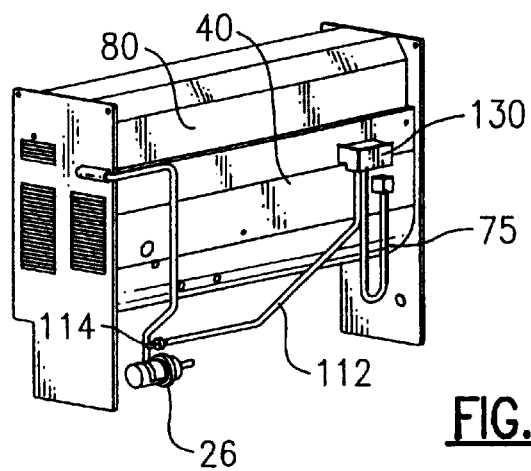
FIG. 5 is a rear oblique external view of the absorption machine of FIG. 3.

Referring to FIG. 5, there is shown an oblique rear external view of the preferred embodiment of an absorption cooling machine which is equipped with the dilution control apparatus of the present invention. The embodiment of FIG. 5 comprises a model 16DN direct fired absorption chiller manufactured by Carrier Corporation. Because the operation of the system of FIG. 5 will be apparent to those skilled in the art from the foregoing description of FIGS. 2 through 4, FIG. 5 will not be discussed in detail herein.

While the present invention has been described with reference to certain specific embodiments, it will be understood that these embodiments are exemplary only, and that the true spirit and scope of the present invention should be determined with reference to the following claims.

We claim:

1. In an absorption cooling machine of the type which uses a refrigerant and an absorbent and which includes a generator, a condenser, an evaporator including an evaporator sump and a refrigerant pump for pumping refrigerant from said evaporator sump, an absorber including an absorber sump and a solution pump for pumping a refrigerant-absorbent solution from said absorber sump, said evaporator sump and said absorber sump being separated by a partition, and means for connecting said generator, condenser, evaporator and absorber to one another to form a closed absorption cooling system, said cooling system further being of the type which is designed to shut down in accordance with a dilution cycle during which the quantity of refrigerant within the evaporator sump becomes large enough to overflow said partition and thereby reduce the concentration of the solution in said absorber sump to a value below that at which crystallization occurs, an improved refrigerant control apparatus comprising:

a primary refrigerant reservoir for receiving refrigerant condensing within said condenser and for storing a quantity of refrigerant which, if released into the system during said dilution cycle, is sufficient to lower the concentration of said solution from a concentration which is within the range of concentrations that said solution may have when the system operates in its cooling mode to a concentration which is low enough to prevent crystals from forming in said solution after said dilution cycle has been completed;

primary refrigerant releasing means, including barrier means, located at an extremity of said primary reservoir, for defining at least one primary flow path along which refrigerant may flow from said primary reservoir to said evaporator sump when the system is operating in its cooling mode;

a secondary refrigerant reservoir disposed in bidirectional fluidic communication with said primary reservoir; and secondary refrigerant releasing means for establishing a secondary flow path along which refrigerant may flow from said secondary reservoir to said evaporator sump when said dilution cycle is in progress.

2. A machine as set forth in claim 1 in which said condenser includes a condenser sump, in which said secondary refrigerant reservoir is fluidically associated with said condenser sump, and in which said secondary refrigerant releasing means includes a pipe for conducting a flow of refrigerant from said secondary refrigerant reservoir to said evaporator sump, and a valve for blocking the flow of liquid through said pipe when the discharge pressure of said refrigerant pump is greater than a predetermined value.

3. A machine as set forth in claim 2 in which said valve comprises a check valve.

4. A machine as set forth in claim 2 in which said valve comprises a swing check valve.

5. A machine as set forth in claim 2 in which said pipe is connected to the discharge end of said refrigerant pump.

6. A machine as set forth in claim 1 in which said secondary refrigerant reservoir includes a secondary barrier which defines an opening having a size related to the rate at which refrigerant is to be released by said secondary refrigerant releasing means.

7. A machine as set forth in claim 1 in which said condenser includes a condenser sump, in which said primary refrigerant reservoir is fluidically associated with said condenser sump, and in which said primary refrigerant releasing means includes an outlet box connected to receive refrigerant flowing along said at least one primary flow path.

8. A machine as set forth in claim 7, further including a pipe for conducting a flow of refrigerant from said outlet box to said evaporator sump, in which said at least one primary flow path includes a first primary flow path including an opening through a lower portion of said barrier means, and a second primary flow path including an overflow structure in proximity to an upper portion of said barrier means.

9. A machine as set forth in claim 1 in which said condenser includes a condenser sump, in which said primary and secondary refrigerant reservoirs are both fluidically associated with said condenser sump, in which said primary refrigerant releasing means includes a first part of an outlet box connected to receive refrigerant from said primary reservoir and a first pipe for connecting the first part of said outlet box to said evaporator sump, and in which said secondary refrigerant releasing means includes a second part of said outlet box and a second pipe for connecting the second part of said outlet box to said evaporator sump.

10. A machine as set forth in claim 9 in which the first and second parts of said outlet box are separated by a partition that prevents refrigerant from flowing therebetween.

11. In an absorption cooling machine of the type which uses a refrigerant and an absorbent and which includes a generator, a condenser, an evaporator including an evaporator sump and a refrigerant pump for pumping refrigerant from said evaporator sump, an absorber including an absorber sump and a solution pump for pumping a refrigerant-absorbent solution from said absorber sump, said evaporator sump and said absorber sump being separated by a partition, and means for connecting said generator, condenser, evaporator and absorber to one another to form a closed absorption cooling system, said cooling system further being of the type which is designed to shut down in accordance with a dilution cycle during which the quantity of refrigerant within the evaporator sump becomes large enough to overflow said partition and thereby reduce the concentration of the solution in said absorber sump to a value below that at which crystallization occurs, an improved refrigerant control apparatus comprising:

a primary reservoir associated with said condenser for receiving refrigerant condensing within said condenser and for storing a quantity of refrigerant which, if released into the system, is sufficient to lower the concentration of said solution from a concentration which is within a first range of concentrations that said solution may have when the system operates in its cooling mode to a lower concentration which is within a second range of concentrations that said solution may have on completing said dilution cycle;

an outlet box positioned to receive refrigerant flowing out of said primary reservoir;

a first drain pipe for conducting a flow of refrigerant from said outlet box to said evaporator;

a barrier disposed between said primary reservoir and said outlet box, said barrier defining at least one refrigerant release path along which refrigerant may flow from said primary reservoir to said outlet box, at a variable rate, when the system operates under a variable cooling load;

a secondary reservoir in fluidic communication with said primary reservoir;

a second drain pipe for conducting a flow of refrigerant from said secondary refrigerant reservoir to said evaporator; and refrigerant blocking means for blocking the flow of refrigerant through said second drain pipe when said dilution cycle is not in progress.

12. A machine as set forth in claim 11 in which said refrigerant blocking means comprises a valve that is arranged to open when the discharge pressure of said refrigerant pump has less than a predetermined value.

13. A machine as set forth in claim 12 in which said valve comprises a check valve.

14. A machine as set forth in claim 12 in which said second drain pipe is connected to the discharge end of said refrigerant pump.

15. A machine as set forth in claim 11 in which said second drain pipe is connected to the discharge end of said refrigerant pump.

16. A machine as set forth in claim 11 in which said condenser includes a condenser sump, in which said condenser sump serves as said primary reservoir.

17. A machine as set forth in claim 11 in which said at least one refrigerant release path includes a first opening through a lower portion of said barrier, and at least one fluid flow path that extends over or through an upper portion of said barrier.

18. A machine as set forth in claim 11 in which said secondary reservoir is located within said outlet box, and in which said secondary reservoir is prevented from releasing refrigerant into said evaporator, through said first drain pipe, by a barrier located within said outlet box.

* * * * *